(12) United States Patent
Vokaliga et al.

(10) Patent No.: US 11,567,898 B2
(45) Date of Patent: Jan. 31, 2023

(54) DYNAMIC STORAGE GROUP RESIZING DURING CLOUD SNAPSHOT SHIPPING

(71) Applicant: EMC IP HOLDING COMPANY LLC, Hopkinton, MA (US)

(72) Inventors: Deepak Vokaliga, Hopkinton, MA (US); Francisco Aquino, Marlborough, MA (US)

(73) Assignee: Dell Products, L.P., Hopkinton, MA (US)

( * ) Notice: Subject to any disclaimer, the term of this patent is extended or adjusted under 35 U.S.C. 154(b) by 1 day.

(21) Appl. No.: 17/078,238

(22) Filed: Oct. 23, 2020

(65) Prior Publication Data
US 2022/0129416 A1    Apr. 28, 2022

(51) Int. Cl.
*G06F 16/11* (2019.01)
*H04L 67/1097* (2022.01)

(52) U.S. Cl.
CPC ........ *G06F 16/128* (2019.01); *H04L 67/1097* (2013.01)

(58) Field of Classification Search
CPC ...... G06F 16/128; G06F 16/11; G06F 16/113; H04L 67/1097
See application file for complete search history.

(56) References Cited

U.S. PATENT DOCUMENTS

| | | | | |
|---|---|---|---|---|
| 2005/0086432 A1* | 4/2005 | Sakai | ............ | G06F 3/0632 711/114 |
| 2009/0100237 A1* | 4/2009 | Orikasa | ............ | G06F 11/1441 711/162 |
| 2014/0006465 A1* | 1/2014 | Davis | ............ | G06F 16/1752 707/827 |
| 2018/0121453 A1* | 5/2018 | Jain | ............ | G06F 16/13 |
| 2019/0332488 A1* | 10/2019 | Bono | ............ | G06F 11/1451 |
| 2019/0384678 A1* | 12/2019 | Samprathi | ............ | G06F 9/45558 |
| 2020/0162318 A1* | 5/2020 | Patil | ............ | G06F 9/5072 |
| 2020/0348863 A1* | 11/2020 | Venkatesan | ............ | G06F 9/5011 |

\* cited by examiner

*Primary Examiner* — Ashish Thomas
*Assistant Examiner* — Dustin D Eyers
(74) *Attorney, Agent, or Firm* — Anderson Gorecki LLP

(57) ABSTRACT

A cloud tethering subsystem is configured to ship snapshots of an application production storage group to a cloud repository. Dynamic storage group resizing operations are allowed on the application production storage group after creation of a snapshot and before transmission of the snapshot to the cloud, or while the snapshot is accessing data of the application production storage group in connection with shipping the snapshot to the cloud. Example dynamic storage group resizing operations include adding one or more volumes to the application production storage group, removing one or more volumes from the application production storage group, and resizing one or more of the volumes of the application production storage group. The cloud tethering subsystem maintains information about the size of the snapshot at the time of creation and uses the snapshot size to prevent dynamic storage group resizing operations from interfering with cloud snapshot shipping operations.

18 Claims, 6 Drawing Sheets

DYNAMIC STORAGE GROUP RESIZING DURING CLOUD SNAPSHOT SHIPPING

FIELD

This disclosure relates to computing systems and related devices and methods, and, more particularly, to a dynamic storage group resizing during cloud snapshot shipping.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A cloud tethering subsystem is configured to ship snapshots of an application production storage group to a cloud repository. Dynamic storage group resizing operations are allowed on the application production storage group after creation of a snapshot and before transmission of the snapshot to the cloud, or while the snapshot is accessing data of the application production storage group in connection with shipping the snapshot to the cloud. Example dynamic storage group resizing operations include adding one or more volumes to the application production storage group, removing one or more volumes from the application production storage group, and resizing one or more of the volumes of the application production storage group. The cloud tethering subsystem maintains information about the size of the snapshot at the time of creation and uses the snapshot size to prevent dynamic storage group resizing operations from interfering with cloud snapshot shipping operations.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
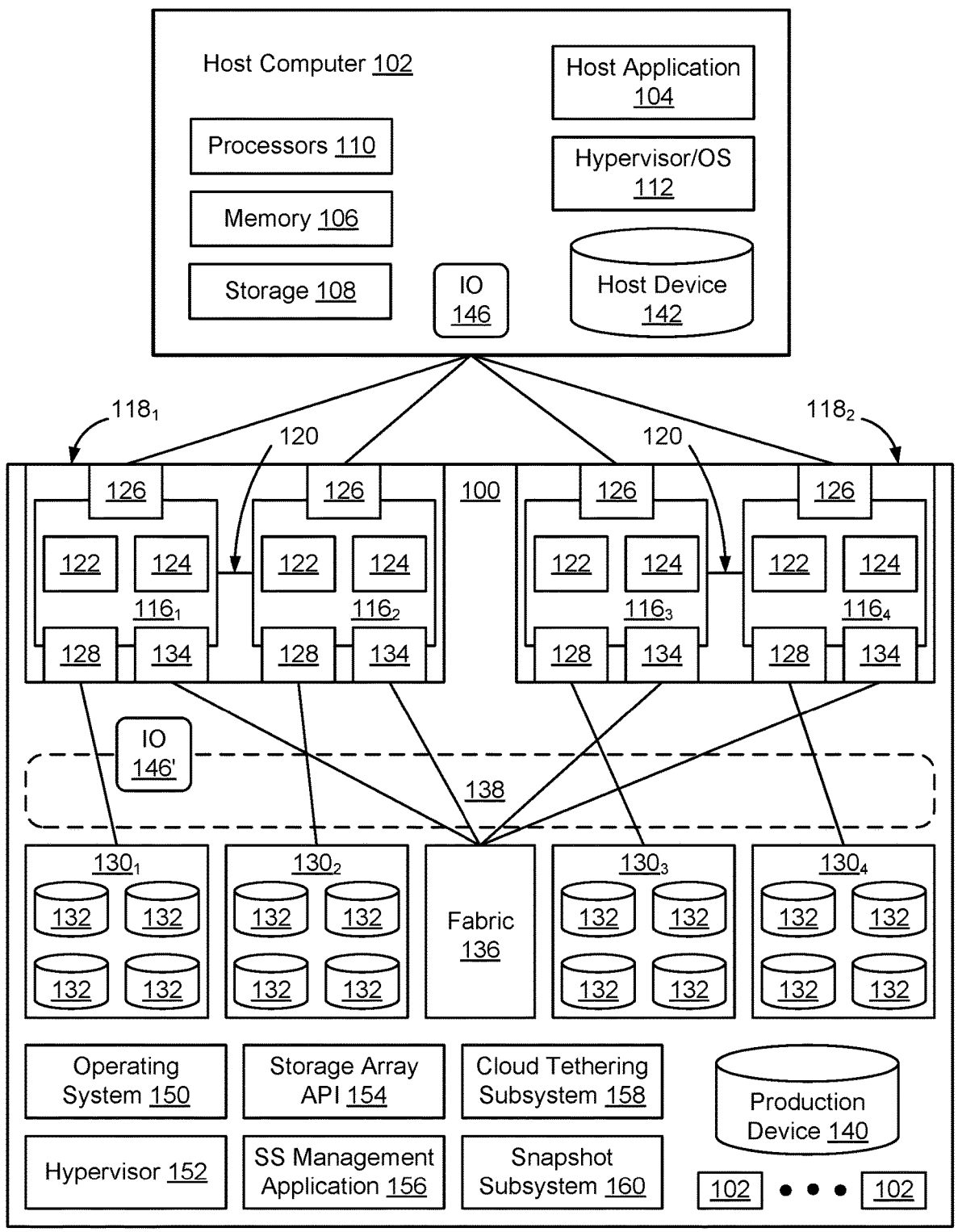
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140 (zoning).

Not all volumes of data on the storage system are accessible to host computer 104. When a volume of data is to be made available to the host computer, a logical storage volume, also referred to herein as a TDev (Thin Device), is linked to the volume of data, and presented to the host computer 102 as a host device 142. For example, to protect the production device 140 against loss of data, a snapshot (point in time) copy of the production device 140 may be created and maintained by the storage system 100. If the host computer 102 needs to obtain access to the snapshot copy, for example for data recovery, the snapshot copy may be linked to a logical storage volume (TDev) and presented to the host computer 102 as a host device 142. The host computer 102 can then execute read/write IOs on the TDev to access the data of the snapshot copy.

As shown in FIG. 1, in some embodiments the storage system 100 has an operating system 150, and one or more system applications. Example system applications shown in FIG. 1 include a hypervisor 152, a storage array API 154, a storage system management application 156, a cloud tethering subsystem 158, and a snapshot subsystem 160. Each of these components is described in greater detail below. The interrelationship between several of these components is also shown in greater detail in FIG. 2.

Figure 2:
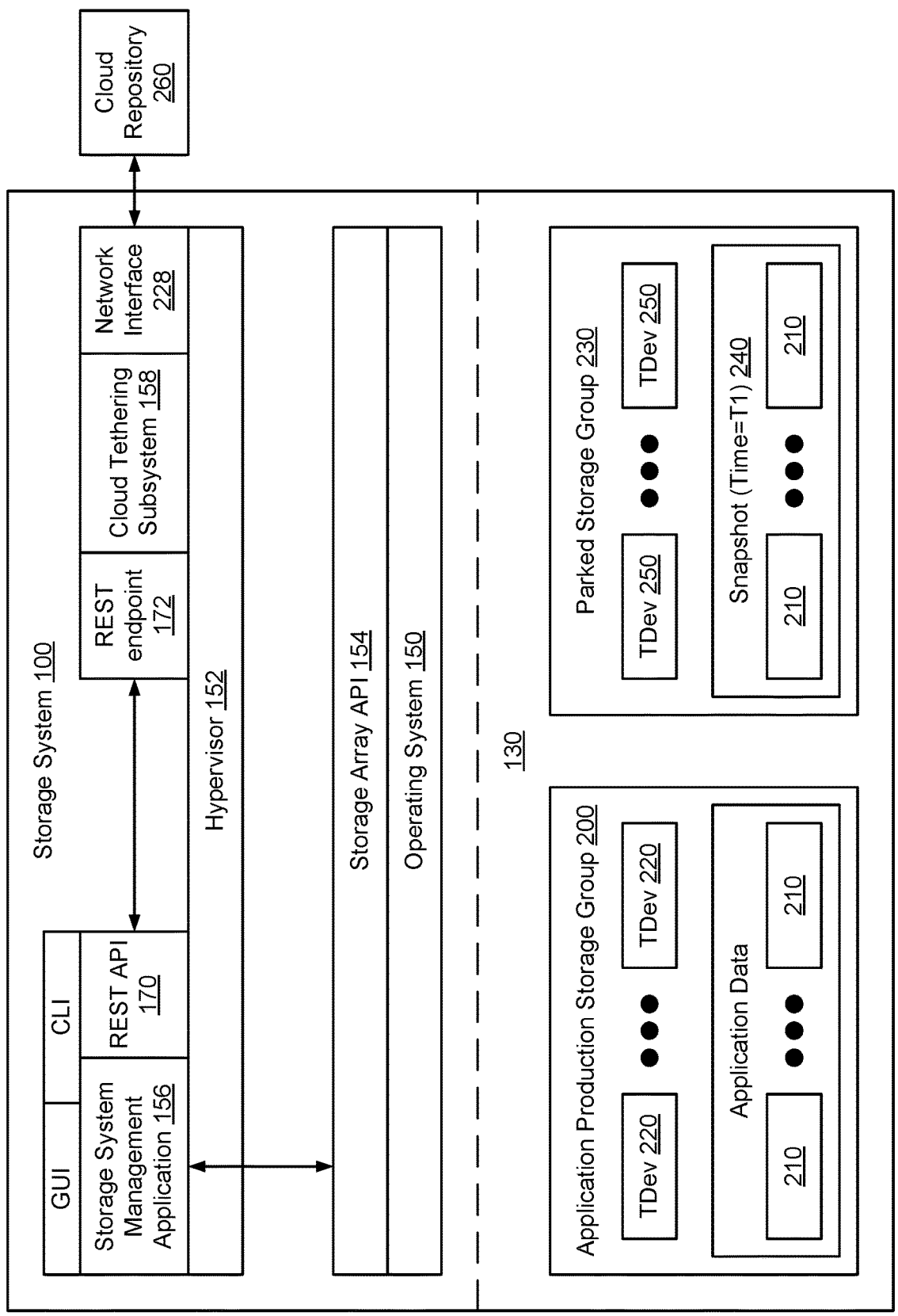
FIG. 2 is a functional block diagram of a storage system connected to a cloud repository, showing the aspects of the storage system configured to enable dynamic storage group resizing operations while shipping snapshots to the cloud repository, according to some embodiments.

In some embodiments, operating system 150 is an embedded operating system of the storage system 100. An example operating system 150 may be based on Linux, although other operating systems may also be used. As shown in FIG. 2, hypervisor 152 is used to abstract the physical resources of the storage system, to enable at least some of the system applications (e.g. cloud tethering subsystem 158) to execute in emulations (e.g. virtual machines) on the storage system 100.

As shown in FIG. 2, storage array API 154, in some embodiments, is an operating system utility configured to interact with the operating system to adjust operation of the storage system. Storage array API 154, in some embodiments, acts as a middle layer between operating system 150 and the storage system management application 156 to enable the storage system management application 156 to create environments on the storage system 100, create storage groups, adjust the size of the storage groups, add or remove volumes from storage groups, change the sizes of the volumes of the storage groups, change the size of access TDevs, and to and perform multiple other storage group resizing operations. In some embodiments, the storage array API 154 provides an API layer to the operating system 150, and accordingly is also referred to herein as an OS-API (Operating System Application Programing Interface).

The storage system management application 156 is an application executing in a container in the storage system 100. An example storage system management application is Unisphere™ although many other storage system management applications exist and can be used depending on the implementation. Users interact with the storage system management application 156 via a GUI (Graphical User Interface) or through a CLI (Command Line Interface), and use the storage system management application 156 to configure operation of the storage system 100. Of importance to this disclosure, in some embodiments the storage system management application 156 includes control logic configured to enable the storage system management application to make modifications to application production storage groups 200 while the cloud tethering subsystem is accessing data of the application production storage group 200 in connection with shipping snapshots of the application production storage group 200 to the cloud.

In some embodiments, the storage system management application 156 is used by the owner to adjust operation of the storage system 100, such as to create application production storage groups 200 to be used by host applications 104, add volumes 210 to application production storage groups 200, link volumes 210 to production devices (TDevs 230) in the application storage group 200, increase or reduce the size of the application production storage group 200, and do other operations on the application production storage group 200.

As shown in FIG. 2, in some embodiments the storage system management application 156 includes a REST API 170 configured to communicate with a public or private REST endpoint 172 on the cloud tethering subsystem 158. Other ways of communicating between the storage system management application 156 and cloud tethering subsystem 158 may be implemented as well.

The cloud tethering subsystem 158 is responsible for creating cloud providers on the cloud repository 260 and managing transmission of snapshots and other volumes of data from the storage system 100 to the cloud repository 260 over network interfaces 228. For example, it may be desirable to move at least some of the snapshot copies created by snapshot subsystem 160 from the storage system 100 to a cloud repository 260, for example to free up space in the back-end drive arrays 130, or for many other reasons.

In some embodiments, if access to the cloud repository 260 is desired, the storage system management application 156 causes an instance of cloud tethering subsystem 158 to be created on the storage system 100 and implements a process of interconnecting the cloud tethering subsystem 158 with the storage system management application 156 and embedded operating system 150. In the following discussion, it is assumed that the cloud tethering subsystem 158 has been correctly instantiated on the storage system 100 and is ready to be used to communicate with external cloud repositories 260, for example to transmit snapshots of filesystems to the cloud repositories 260. A given storage system may have multiple instances of cloud tethering subsystem 158 instantiated thereon. A given cloud tethering subsystem 158 may have multiple cloud providers that it uses to store snapshots of different storage groups. Example cloud service providers, that are configured to implement cloud repositories 260, include ECS (Elastic Cloud Storage), Amazon S3, Google Cloud, and Microsoft Azure, although any number of cloud providers might be used.

As noted above, the cloud tethering subsystem 158, in some embodiments, is used to move snapshots of filesystems to cloud repository 260. Snapshot subsystem 160, in some embodiments, is configured to create these "snapshots". A "snapshot," as that term is used herein, is a copy of a volume of data as that volume existed at a particular point in time. A snapshot of a production device 140, accordingly, is a copy of the data stored on the production device 140 as the data existed at the point in time when the snapshot was created. A snapshot can be either target-less (not linked to a TDev) or may be linked to a target TDev when created.

In some embodiments, the storage system 100 uses storage groups to control access to data. A storage group 200 is a logical collection of one or more volumes 210 of data within the storage array. Access to the volumes is limited to a host or set of hosts that is associated with the storage group. A host cannot access or modify data in any storage system volumes 210 that are not part of its storage group.

A user sets snapshot policies on the storage groups. These policies define the frequency of the snapshot, the retention period of the snapshots, and optionally a cloud provider where the snapshots are to be stored. The frequency tells the snapshot subsystem 160 in the storage array 130 to create a snapshot 250 against all the volumes 210 in a storage group 200 at a regular cadence, as defined by the user. The sets of snapshots 250 taken against a storage group are referred to as snapsets. The retention period defines the age of the snapshot 250 when it should be deleted. If a cloud provider is specified, this parameter tells the storage system the identity of the cloud-based object repository (cloud provider 260) where the snapshots 250 need to be shipped.

In connection with transmitting a snapshot 240 to a cloud repository 260, a TDev 250 of the parked storage group 230 is linked to the snapshot 240, and presented to the cloud tethering subsystem 158 as a host device 142. The cloud tethering subsystem 158 then issues read operations on the snapshot 250, and sends the data to the cloud repository 260. To access the storage resources of the storage system 100, the cloud tethering subsystem 158 issues read and write IO operations 146, which are received by front end adapter 126 of the storage system, and processed by the front-end adapter 126.

As shown in FIG. 2, in some embodiments the storage system management application 156 interacts with the storage array API 154 to cause the creation of an application production storage group 200 on the storage system 100. The application production storage group 200 has a set of volumes 210 that are used to store application data. A set of thin devices (TDevs) 220 are linked to the volumes 210 and presented to the host computer container as host devices, to enable the host applications 104 to access the data stored in the volumes 210.

Similarly, the storage system management application 156 interacts with the storage array API 154 to cause the creation of a cloud protection environment including a parked storage group 230 to be used for storage of snapshots 240. Each snapshot is taken at a particular point in time and reflects the application data of the set of volumes 210 of the application production storage group 200 at that point in time. A set of thin devices (TDevs) 250 are created for use by the cloud tethering subsystem 158 in connection with shipping of snapshots to the cloud. When a snapshot is to be shipped to the cloud repository 260, a TDev 250 is selected, linked to the snapshot 240, and presented as a host device 142 in the cloud tethering subsystem container. Read operations are then implemented on the TDev 250 by the cloud tethering subsystem 158 to cause the data of the snapshot to be sent to the cloud repository 260.

As users are setting up the cloud policies on the application production storage group 200, the snapshot subsystem 160 will take snapshots regularly on the application production storage group 200, and cloud tethering subsystem 158 will ship the snapshots 240 to the cloud repository 260. While this is happening, the application production storage group 200 is still running production applications, and it may be necessary to perform various storage provisioning operations on the application production storage group 200, depending on the needs of the host application 104. This can be complicated, because the snapshots 240 are often implemented using pointers to data stored in the volumes 210 of the application production storage group 200. Thus, shipping data to a cloud repository 260 will cause the cloud tethering subsystem 158 to access the application data of the application production storage group 200 which can complicate dynamic storage group resizing operations on the application production storage group 200. While it would be possible to delay implanting changes to the application production storage group 200, doing so would restrict operation of the host application 104, often for long periods of time, which is undesirable.

According to some embodiment, all storage group provisioning and resize activities of the application production storage group 200 and of the parked storage group 230 are allowed while cloud snapshots are being taken, prepared, or shipped.

As used herein, the term "Storage Group Resizing" will be used to aspects of storage provisioning that include (1) adding a volume or a set of volumes to a storage group; (2) removing a volume or a set of volumes from a storage group; and (3) dynamic expansion of an existing volume in a storage group. Other types of storage group resizing operations may be implemented as well. Storage group resizing is referred to herein as "dynamic" because is done concurrently with access to the volumes 210 by both the host application 104 and the cloud tethering subsystem 158.

Dynamic Storage Group Resizing of a Production Application Storage Group

As part of snapshot shipping, the cloud tethering subsystem 158 keeps track of all outstanding snapshots 240 on an application production storage group 200 that need to be shipped to the cloud repository 260. As part of the process, the cloud tethering subsystem 158 records the size of the production volumes of the application production storage group 200 at the time of the snapshot was created, and the size of the snapshot 240 that was created. Typically, the size of the snapshot should match the size of the production volumes of the application production storage group 200. In some embodiments, these two numbers are recorded for cross checking and correctness.

While the cloud tethering subsystem reads the snapshot data by linking one of the TDevs in the parked storage group to the volume of the snapshot, the user can use the storage system management application 154 to implement any storage resizing operations on the production application storage group 200. For example, a storage group resizing operation that increases the size of the application production storage group 200 will not create a problem for the cloud tethering subsystem. Because the cloud tethering subsystem 158 records the size of the snapshot and the size of the production volume at the time the snapshot is taken, the cloud tethering subsystem will not read beyond the size of the volume at the time of the snapshot was taken. This avoids any chance for data overruns or application corruption, even where storage resizing operations have been implemented on the application production storage group 200 since the snapshot was taken.

In some embodiments, when the snapshot is shipped to the cloud repository 260, the cloud tethering subsystem 158 also transmits the size of the snapshot at the time the snapshot was taken and the size of the production volume at the time the snapshot was taken. This enables these values to be recorded on the cloud repository as part of the snapshot metadata which lives in the cloud with the objects.

When the last logical block address is read from the snapshot, the cloud tethering subsystem will close the session with that snapshot. The cloud tethering subsystem 158 also cleans up the access TDev associated with the snapshot by requesting the storage array API 154 to unlink the access TDev 250 from the snapshot 240. Optionally, the cloud tethering subsystem 158 may also clean up the snapshot, by requesting that the snapshot be deleted, since the snapshot is now in the cloud and is not needed locally.

Figure 3:
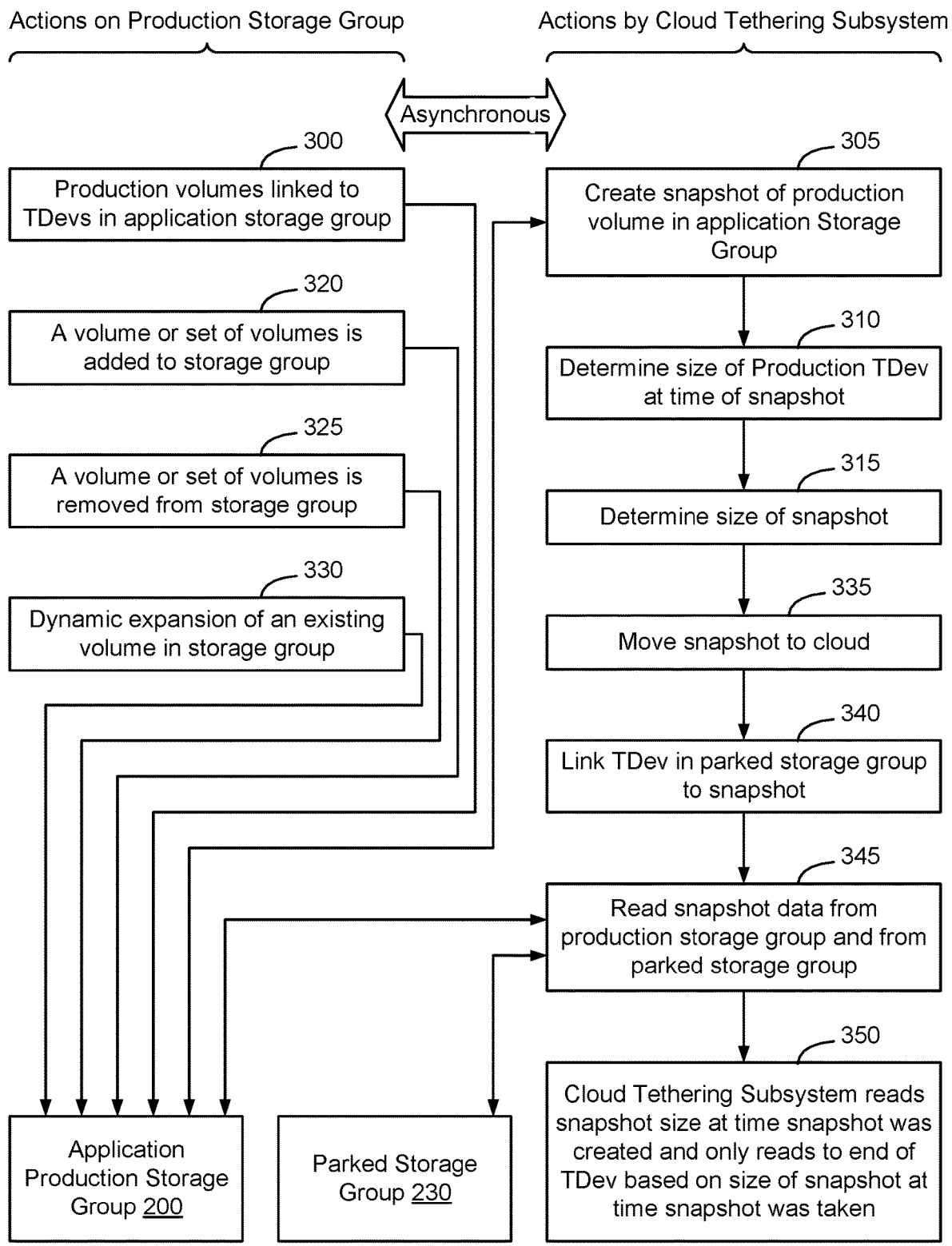
FIG. 3 is a flow chart of an example method of performing dynamic storage group resizing during cloud snapshot shipping, according to some embodiments.

FIG. 3 is a flow chart of an example method of implementing dynamic storage group resizing while performing cloud snapshot shipping, according to some embodiments. In FIG. 3, the actions on the left-hand side (blocks 320, 325, 330) are example dynamic storage group resizing operations that may be taken on the application production storage group 200 at any point, regardless of the state of the cloud tethering subsystem. The right-hand side of FIG. 3 (blocks 305, 310, 315, 335, 340, 345, 350) shows an example process that the cloud tethering subsystem 158 might take in connection with shipping a snapshot to the cloud repository 260. As shown in FIG. 3, in some embodiments the cloud tethering subsystem 158 is configured to enable the dynamic storage group resizing operations to occur concurrently with snapshot shipping operations, such that the dynamic storage group resizing operations do not prevent concurrent operation of the cloud tethering subsystem 158.

As shown in FIG. 3, it is assumed that at least one production volume 210 exists in an application production storage group 200 and is linked to a thin device TDev 220 of the application production storage group 200 (block 300), so that the host application 104 can actively access the application data stored in the volume 210.

At block 305, the cloud tethering subsystem creates a snapshot 240 of the volumes of the application production storage group 200. In connection with creating the snapshot 240, the cloud tethering subsystem 158 will determine the size of the set of volumes of the application production storage group 200 at the time the snapshot was taken (block 310), and determine the size of the snapshot 240 (block 315). Normally these two numbers should match.

While the snapshot 240 is being taken, or at some later point in time, various provisioning actions might be taken on the application production storage group 200. For example, a volume 210 or a set of volumes 210 may be added to the application production storage group 200 (block 320). Additionally or alternatively, a volume 210 or a set of volumes 210 may be removed from the application production storage group 200 (block 325). Likewise, one or more of the volumes 210 of the application production storage group 200 may be increased in size or decreased in size in the application production storage group 200 (block 330). Each of these optional storage group resizing operations may be taken on the application production storage group 200 asynchronously from any of the actions of the cloud tethering subsystem 158. The arrows from blocks 320, 325, and 330 to the application production storage group 200 indicate that these example storage group resizing operations are able to be implemented on the application production storage group 200 at any point in time, regardless of the state of the cloud tethering subsystem 158.

At some point in time, the cloud tethering subsystem 158 initiates transmission of the snapshot 240 to the cloud repository 260 (block 335). The cloud tethering subsystem 158 is not constrained by any ongoing or pending provisioning operations on the application production storage group 200, even though the cloud tethering subsystem 158 may need to access data stored by the application production storage group 200 in connection with reading data of the snapshot 240 out to the cloud repository 260.

As shown in FIG. 3, in connection with moving a snapshot 240 to the cloud repository 260, a TDev 250 will be linked to the snapshot 240 and presented to the container of the cloud tethering subsystem (block 340). The cloud tethering subsystem 158 reads snapshot data from the production storage group 200 and parked storage group 230 (block 345) to ship the snapshot 240 to the cloud tethering repository 158. To ensure that any dynamic storage group resizing activities that may have occurred on the application production storage group after creation of the snapshot don't affect transmission of the snapshot 240 to the cloud repository 260, in some embodiments the cloud tethering subsystem reads the snapshot size at the time the snapshot was created (block 350). By only reading to the end of the TDev based on the size of the snapshot at the time the snapshot was taken, it is possible to prevent data overruns or application corruption issues.

Dynamic Storage Group Resizing of a Parked Storage Group

As noted in the preceding description, the cloud tethering subsystem 158, accesses the snapshot 240 using one of the TDevs of the parked storage group 230. The size of the TDev, in some embodiments, is created to initially have a size of 250 GB and is reserved for the purpose of snapshot shipping. When the snapshot shipping process starts, the cloud tethering subsystem sends a request to the storage system management system 156 to prepare the snapshot to be shipped to the cloud repository 260. In response, the storage system management application 156 instructs the storage array API 154 to prepare the snapshot for shipping in the storage system operating system 150.

In connection with preparing the snapshot 240 for shipping, the storage array API 154 will try to find a TDev with the same size as the snapshot. The TDev assigned to be linked to the snapshot 240 may be larger than the snapshot, but may not be smaller. Accordingly, if the snapshot has a size smaller than 250 GB, a TDev with the initial default size of 250 GB may be selected and linked to the snapshot 240. If no TDev is located that has the same size as the snapshot, for example if the snapshot is larger than the TDev default 250 GB size, a TDev is selected for use with shipping the snapshot to the cloud repository and the storage array API 154 does an online device expansion of an existing free TDev 250 from the parked storage group 230 to match the snapshot size. This process makes sure that the size of the access TDev 250 and the size of the snapshot match. This process of dynamic access device resizing in connection with snapshot shipping is described in greater detail in connection with FIG. 6.

Figure 4:
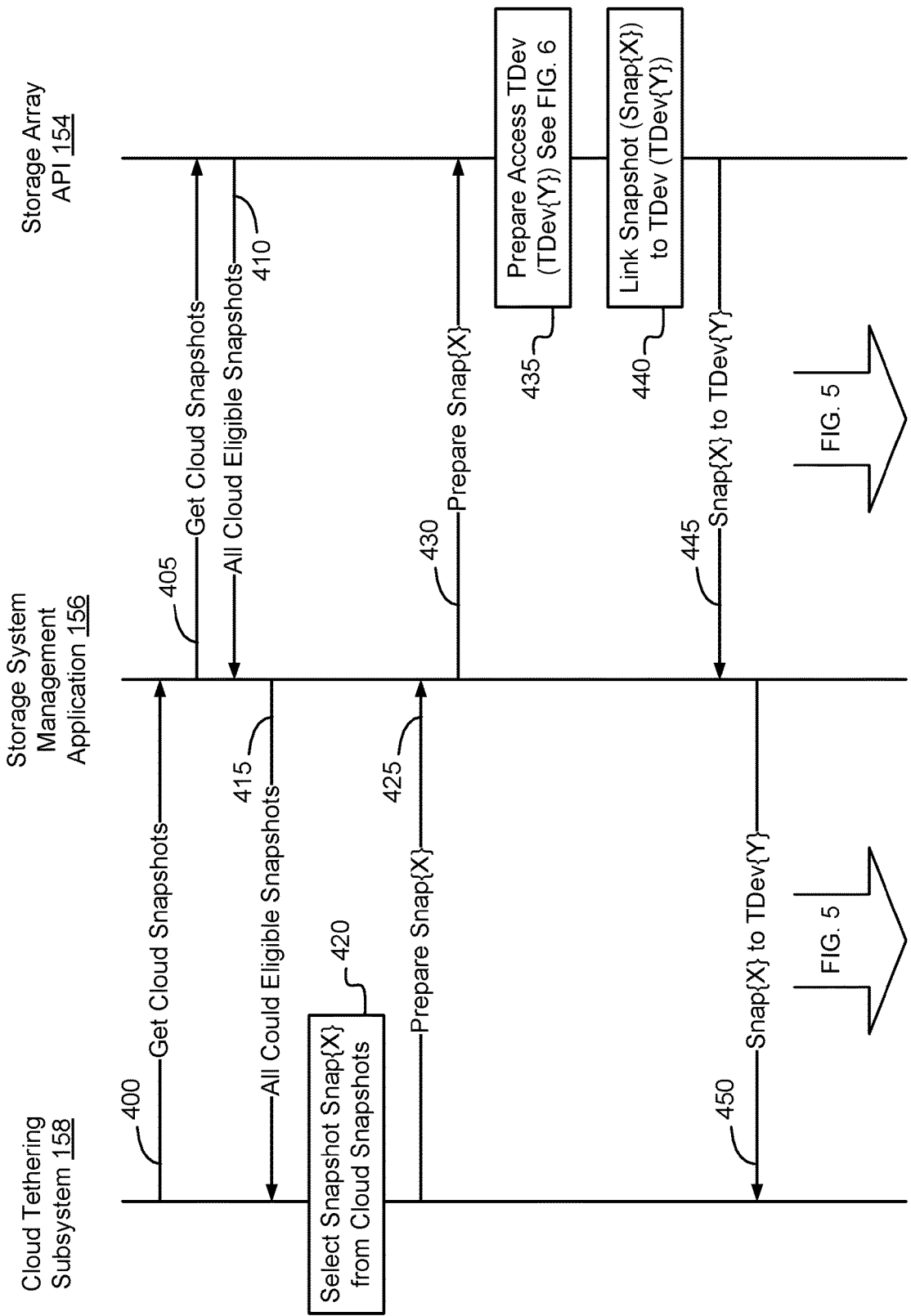
FIGS. 4 and 5 are swim lane diagrams showing the exchange of messages between a cloud tethering subsystem, storage system management application, and storage array API in connection with cloud snapshot shipping, according to some embodiments.
Figure 5:
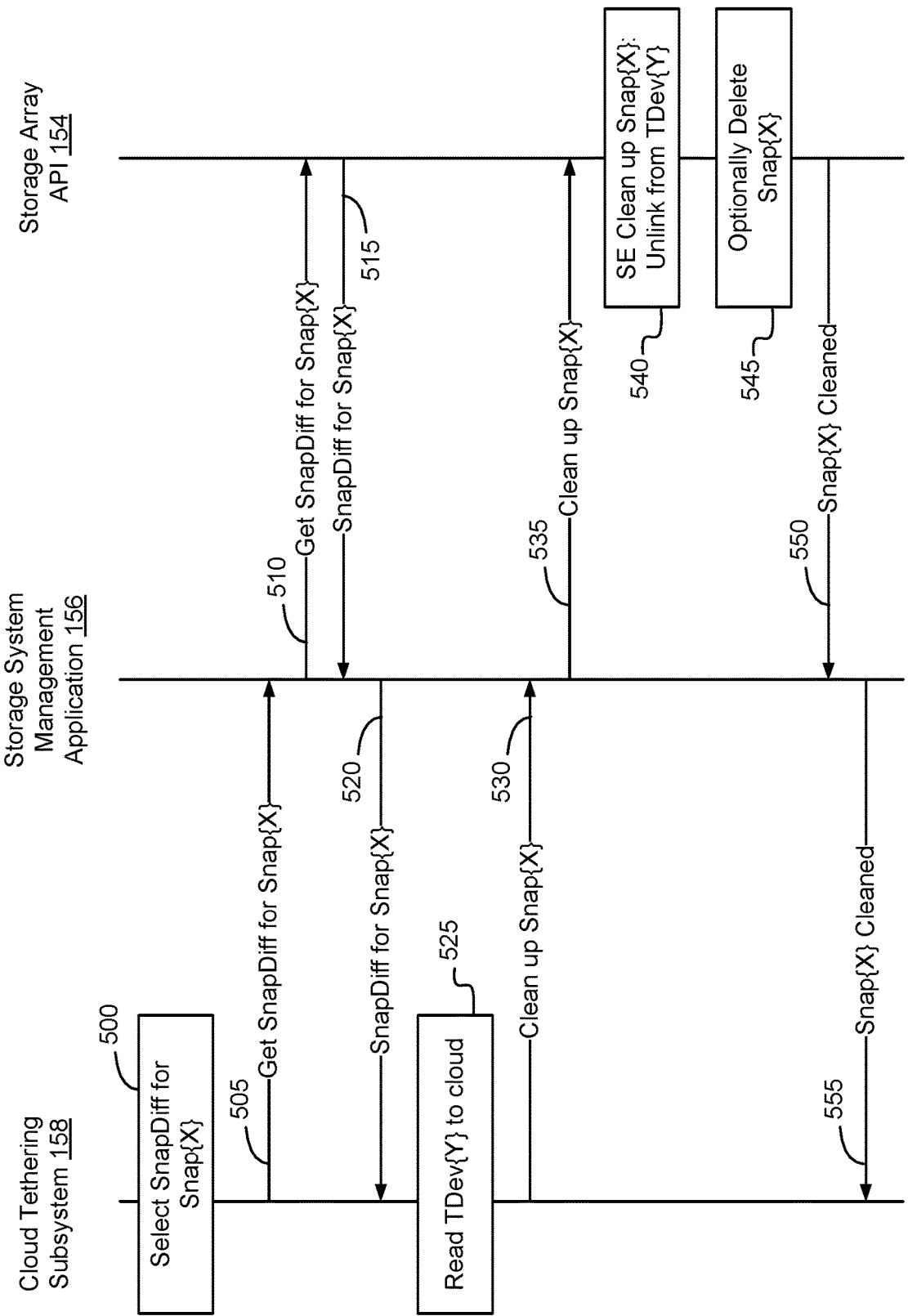

FIGS. 4 and 5 are swim lane diagrams showing the exchange of messages between a cloud tethering subsystem 158, storage system management application 156, and storage array API 154 in connection with cloud snapshot shipping, according to some embodiments.

As shown in FIG. 4, in some embodiments, the cloud tethering subsystem 158 sends a request to the storage system management application 156 (arrow 400) to get a list of cloud snapshots. In response, the storage system management application 156 sends a request to the storage array API 154 (arrow 405) to instruct the storage array API 154 to provide a list of all snapshots 240 installed in the operating system 150. The storage array API 405 implements the request and returns a list of all cloud eligible snapshots (arrow 410). This list is then forwarded from the storage system management application 156 to the cloud tethering subsystem 158 (arrow 415).

The cloud tethering subsystem 158 then selects one of the snapshots to be shipped to the cloud repository 260 (block 420). Although the cloud tethering subsystem may ship more than one snapshot at a time, the following description will focus on actions taken in connection with shipping a single snapshot, labeled Snap{X}, to the cloud repository.

As shown in FIG. 4, after selecting a particular snapshot (Snap{X}), the cloud tethering subsystem 158 sends a request to the storage system management application 156 (arrow 425) to prepare the snapshot (snap{X}) for shipping. In response, the storage system management application 156 sends a request to the storage array API 154 (arrow 430) to instruct the storage array API 154 to prepare the snapshot (snap{X}) for shipping in the storage system operating system 150.

In response, the storage array API 154 prepares an access TDev 250 referred to herein as TDev{Y} for use with the snapshot (block 435). Additional details associated with preparing an access TDev (TDev{Y}) are discussed below in greater detail in connection with FIG. 6. The storage array API 154 also links the access TDev 250 (TDev{Y}) with the selected snapshot (Snap{X}), and connects the access TDev 250 (TDev{Y}) to the container of the cloud tethering subsystem 158 (block 440). At his point, the cloud tethering subsystem 158 can implement read operations on the access TDev 250 (TDev{Y}), to read the data of the snapshot 240 and ship the snapshot to the cloud repository 260. After the access TDev 250 (TDev{Y}) has been linked to the snapshot (Snap{X}), the storage array API 154 returns a confirmation response to the storage system management application 156 (arrow 445). Similarly, the storage system management application 156 returns a confirmation of successful linkage to the cloud tethering subsystem 158 (arrow 450). The process then continues to FIG. 5.

As shown in FIG. 5, in some embodiments the cloud tethering subsystem only wants to ship aspects of the application production storage group that have changed between snapshots. One way to do this is to use a differencing engine to generate a list of changed files between two snapshot copies. This difference between two snapshot copies will be referred to herein as a SnapDiff.

Accordingly, at block 500, the cloud tethering subsystem 158 generates a message to request creation of a SnapDiff for the selected snapshot (Snap{X}) from a previous snapshot of the same application production storage group 200. The cloud tethering subsystem sends a request to the storage system management application 156 (arrow 505) to obtain the SnapDiff for snapshot (Snap{X}). In response, the storage system management application 156 sends a request to the storage array API 154 (arrow 510) to instruct the storage array API 154 to get a SnapDiff of snapshot (snap{X}).

The storage array API 154 obtains the SnapDiff of snapshot (Snap{X}) and responds to the storage system management application 156 (arrow 515). The storage system management application 156 returns the SnapDiff of snapshot (Snap{X}) to the cloud tethering subsystem 158 (arrow 520). Based on the SnapDiff, the cloud tethering subsystem knows which tracks of the snapshot should be shipped to the cloud repository 260—tracks of the snapshot that the SnapDiff identifies as having not changed between the snapshots will be ignored by the cloud tethering subsystem 158 and not shipped to the cloud repository 260. The cloud tethering subsystem 158 then executes read operations on the access TDev (TDev{Y}) (block 525) to ship the snapshot 240 to the cloud repository 260.

Once the snapshot 240 has been shipped to the cloud repository 260, the cloud tethering subsystem 158 sends a request to the storage system management application 156 (arrow 530) to clean up the snapshot (Snap{X}) on the storage system 100. In response, the storage system management application 156 sends a request to the storage array API 154 (arrow 535) to instruct the storage array API 154 to clean up the snapshot (Snap{X}) on the storage system 100.

In response, the storage array API 154 cleans up the snapshot (Snap{X}) on the storage system by unlinking the snapshot (Snap{X}) from the access TDev (TDev{Y}) (block 540). This returns the access TDev 250 to a pool of available devices in the parked storage group 230 to enable the access TDev 250 to be used for other operations, e.g. in connection with shipping other snapshots. To minimize the amount of storage reserved for use by the access TDev 250, in some embodiments the size of the access TDev (TDev{Y}) is reset to its original size of 250 GB.

Optionally, since the snapshot (Snap{X}) is no longer needed on the storage system 100, the snapshot (Snap{X}) may be deleted (block 545). The storage array API 154 returns a confirmation response to the storage system management application 156 that the snapshot (Snap{X}) has been cleaned up on the storage system (arrow 550). Similarly, the storage system management application 156 returns a confirmation response to the cloud tethering subsystem 158 (arrow 555) that the snapshot (Snap{X}) has been cleaned up on the storage system.

Figure 6:
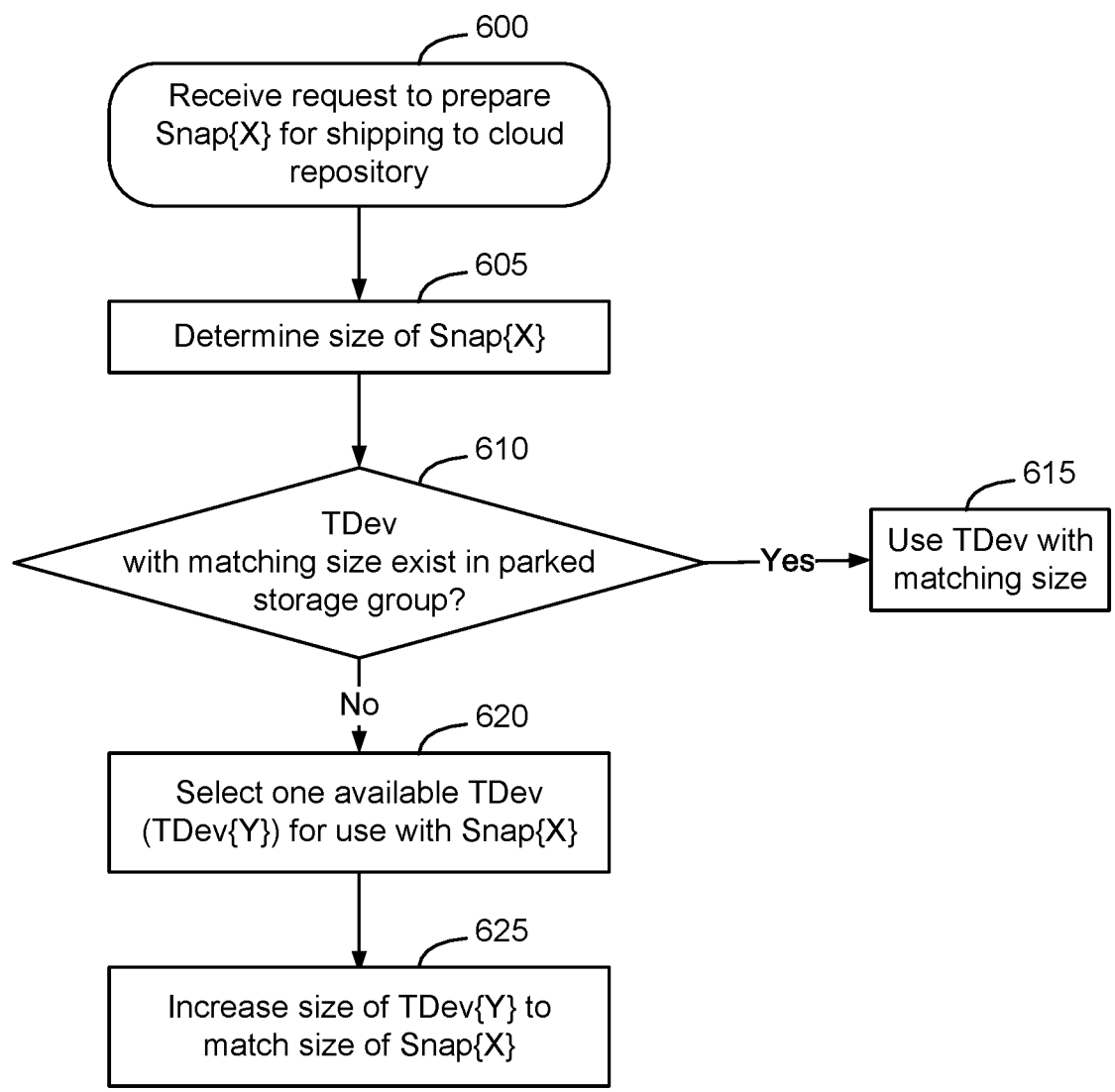
FIG. 6 is a flow chart of an example method of dynamic access device resizing operations in connection with preparing a snapshot to be shipped to a cloud repository, according to some embodiments.

FIG. 6 is a flow chart of an example method of dynamic resizing of an access device in connection with shipping a snapshot to a cloud repository (See FIG. 4, block 435), according to some embodiments. As shown in FIG. 6, when the storage array API 154 receives a request to prepare a snapshot (Snap{X}) for shipping to a cloud repository, in some embodiments the storage array API 154 determines the size of the snapshot (Snap{X}) (block 605).

There are several ways that the storage array API 154 may determine the required size of the snapshot (Snap{X}). In some embodiments, the request from the storage system management application 156 includes the size of the snapshot and/or the size of the production volume at the time the snapshot was taken. In other embodiments, the size of the snapshot 240 and/or the size of the volumes of the application production storage group 200 at the time of creation of the snapshot is stored in metadata associated with the snapshot in the operating system. In these embodiments, the storage array API 154 can determine the required size of the snapshot from the snapshot metadata.

Once the storage array API 154 knows the size of the snapshot, the storage array API 154 looks to find an access TDev 250 with a matching size in the parked storage group 230 (block 610). If there is a TDev that is the same size or larger than the selected snapshot (a determination of YES at block 610), the storage array API 154 selects that access TDev and links the selected TDev (TDev{Y}) to the snapshot (Snap{X}) (block 615).

If there is no TDev 250 that is the same size or larger than the selected snapshot (a determination of NO at block 610) the storage array API 154 selects one of the available access TDevs 250 of the parked storage group 230 (block 620) and increases the size of the selected access TDev 250 (TDev{Y}) to match the size of the snapshot (Snap{X}). The snapshot (Snap{X}) is then linked to the access TDev 250 (TDev{Y}) (FIG. 4, block 440) and the process continues as shown in FIGS. 4-5.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for dynamic storage group resizing during cloud snapshot shipping, the computer program including a set of instructions which, when executed by a computer, cause the computer to perform a method comprising the steps of:
   creating an application production storage group in storage resources of a storage system, the application production storage group including a plurality of volumes of data;
   accessing the volumes of data of the application production storage group by a host computer;
   creating a snapshot of a set of volumes of data of an application production storage group in storage resources of a storage system, the snapshot being a point-in-time copy of the volumes of data in the storage resources of the storage group, as the volumes of data existed at the time when the snapshot was created;
   determining a size of the snapshot at the time when the snapshot was created;
   determining a size of the volumes of data at the time the snapshot was created; and
   implementing a dynamic storage group resizing operation on the application production storage group in the storage resources of the storage system by a management application executing on the storage system, while the host computer is accessing the volumes of data of the application production storage group, and while a cloud tethering subsystem executing on the storage system is accessing data of the volumes of data of the application production storage group in the storage resources of the storage system, to transmit the snapshot of the set of volumes from the storage resources of the storage system to a cloud repository.

2. The non-transitory tangible computer readable storage medium of claim 1, wherein the dynamic storage group resizing operation comprises adding a volume or a set of volumes to the application production storage group.

3. The non-transitory tangible computer readable storage medium of claim 1, wherein the dynamic storage group resizing operation comprises removing a volume or a set of volumes from the application production storage group.

4. The non-transitory tangible computer readable storage medium of claim 1, wherein the dynamic storage group resizing operation comprises dynamic expansion of one of the volumes of the application production storage group.

5. The non-transitory tangible computer readable storage medium of claim 1, wherein the step of accessing data of the application production storage group to transmit the snapshot of the set of volumes to the cloud repository, is implemented by the cloud tethering subsystem to move the snapshot to a cloud repository.

6. The non-transitory tangible computer readable storage medium of claim 5, wherein accessing data of the application production storage group to transmit the snapshot of the set of volumes to the cloud repository comprises not reading beyond the size of the volumes of data at the time the snapshot was created.

7. The non-transitory tangible computer readable storage medium of claim 5, further comprising transmitting the size of the snapshot and the size of the volumes of data to the cloud repository.

8. The non-transitory tangible computer readable storage medium of claim 1, further comprising storing the size of the snapshot at the time when the snapshot was created and storing the size of the volumes of data at the time the snapshot was created.

9. The non-transitory tangible computer readable storage medium of claim 8, wherein accessing data of the application production storage group to transmit the snapshot of the set of volumes to the cloud repository comprises accessing the stored size of the snapshot and the stored size of the volumes of data.

10. The non-transitory tangible computer readable storage medium of claim 1, further comprising:
    selecting the snapshot to be transmitted to a cloud repository;
    selecting an access Thin Device (TDev) to be used to move the snapshot to the cloud repository;
    linking the access TDev to the snapshot; and
    dynamically adjusting a size of the selected access TDev to match the size of the snapshot.

11. The non-transitory tangible computer readable storage medium of claim 1, further comprising:
    requesting a list of snapshots designated to be transmitted to the cloud repository, by the cloud tethering subsystem, from a storage array API;
    receiving the list of snapshots, by the cloud tethering subsystem, from the storage array API;
    selecting a first of the snapshots by the cloud tethering subsystem;
    instructing, by the cloud tethering subsystem, the storage array API to prepare the first of the snapshots for shipping to the cloud repository; and
    preparing, by the storage array API, the first of the snapshots for shipping to the cloud repository.

12. The non-transitory tangible computer readable storage medium of claim 11, wherein preparing the first of the snapshots comprises linking the first of the snapshots to an access Thin Device (TDev) and, when the access TDev has a size that is smaller than a size of the first of the snapshots, dynamically increasing the size of the selected access TDev to match the size of the snapshot.

13. The non-transitory tangible computer readable storage medium of claim 12, further comprising instructing, by the cloud tethering subsystem, the storage array API to clean up the first of the snapshots after the first of the snapshots has been shipped to the cloud repository.

14. The non-transitory tangible computer readable storage medium of claim 13, wherein cleaning up the first of the snapshots comprises unlinking the access TDev from the first of the snapshots by the storage array API, and resetting the size of the access TDev to a default size.

15. The non-transitory tangible computer readable storage medium of claim 14, wherein cleaning up the first of the snapshots comprises removing the snapshot, by the storage array API, from storage resources of the storage system.

16. The non-transitory tangible computer readable storage medium of claim 11, further comprising instructing, by the cloud tethering subsystem, the storage array API to use a differencing engine to generate a list of changed tracks between the selected first snapshot and a previous iteration of the snapshot.

17. A method of dynamic storage group resizing during cloud snapshot shipping, comprising the steps of:
 creating an application production storage group in storage resources of a storage system, the application production storage group including a plurality of volumes of data;
 accessing the volumes of data of the application production storage group by a host computer;
 creating a snapshot of a set of volumes of data of an application production storage group in storage resources of a storage system, the snapshot being a point-in-time copy of the volumes of data in the storage resources of the storage group, as the volumes of data existed at the time when the snapshot was created;
 determining a size of the snapshot at the time when the snapshot was created;
 determining a size of the volumes of data at the time the snapshot was created; and
 implementing a dynamic storage group resizing operation on the application production storage group in the storage resources of the storage system by a management application executing on the storage system, while the host computer is accessing the volumes of data of the application production storage group, and while a cloud tethering subsystem executing on the storage system is accessing data of the volumes of data of the application production storage group in the storage resources of the storage system, to transmit the snapshot of the set of volumes from the storage resources of the storage system to a cloud repository.

18. The method of claim 17, wherein accessing data of the application production storage group to transmit the snapshot of the set of volumes to the cloud repository comprises not reading beyond the size of the volumes of data at the time the snapshot was created.

* * * * *